US008761103B2

(12) United States Patent
Wang et al.

(10) Patent No.: US 8,761,103 B2
(45) Date of Patent: Jun. 24, 2014

(54) METHOD AND DEVICE FOR INDICATING FRAME MAPPING MODES

(75) Inventors: Xinhui Wang, Shenzhen (CN); Jing Li, Shenzhen (CN)

(73) Assignee: ZTE Corporation, Shenzen (CN)

( * ) Notice: Subject to any disclaimer, the term of this patent is extended or adjusted under 35 U.S.C. 154(b) by 0 days.

(21) Appl. No.: 13/378,345

(22) PCT Filed: Nov. 12, 2009

(86) PCT No.: PCT/CN2009/074911
§ 371 (c)(1),
(2), (4) Date: Dec. 14, 2011

(87) PCT Pub. No.: WO2011/057441
PCT Pub. Date: May 19, 2011

(65) Prior Publication Data
US 2012/0213168 A1    Aug. 23, 2012

(51) Int. Cl.
*H04W 72/04*    (2009.01)
(52) U.S. Cl.
USPC ........................................ 370/329
(58) Field of Classification Search
CPC ............ H04W 72/0446; H04W 52/16; H04W 52/325; H04W 72/082; H04W 72/042; H04W 8/22; H04L 2025/03426; H04L 25/03012; H04L 2209/08; H04L 2209/80; H04L 9/0637
USPC ............................ 370/254–350; 709/201–213
See application file for complete search history.

(56) References Cited

U.S. PATENT DOCUMENTS

| 8,374,156 | B2* | 2/2013 | Yu et al. ......................... 370/337 |
| 2002/0044564 | A1* | 4/2002 | Ranta ............................. 370/436 |
| 2005/0202822 | A1 | 9/2005 | Park et al. |
| 2010/0067440 | A1* | 3/2010 | Dick et al. ..................... 370/328 |
| 2012/0213373 | A1* | 8/2012 | Xin et al. ....................... 380/287 |

FOREIGN PATENT DOCUMENTS

| CN | 101009675 | 8/2007 |
| CN | 101123789 | 2/2008 |

OTHER PUBLICATIONS

ETSI TS 124 008 V3.17.0 (Sep. 2003).*
PCT/CN2009/074911, International Search Report, May 19, 2011.

* cited by examiner

*Primary Examiner* — Ayaz Sheikh
*Assistant Examiner* — Debebe Asefa
(74) *Attorney, Agent, or Firm* — Kunzler Law Group

(57) ABSTRACT

A method for indicating a frame mapping way is provided, including: a network side notifying a mobile station of information of a SACCH frame mapping way used by the mobile station. An apparatus for indicating a frame mapping way is further provided, including a determination unit and a notification unit, wherein the determination unit is for determining a used SACCH frame mapping way for a mobile station; the notification unit is for notifying the mobile station of information of a SACCH frame mapping way used by the mobile station. With the invention, the network side can notify the mobile station of the information of which frame mapping way is used determined for the mobile station, thereby solving the problem that the mobile station does not know which frame mapping way is used, greatly improving the performance of the communication system after the mobile station uses the determined frame mapping way.

16 Claims, 3 Drawing Sheets

METHOD AND DEVICE FOR INDICATING FRAME MAPPING MODES

FIELD OF THE INVENTION

The present invention relates to the indication technique of the frame mapping way, and in particularly, to a method and an apparatus for indicating a frame mapping way.

BACKGROUND

FIG. 1 is a schematic diagram of the existing GSM network architecture, as shown in FIG. 1, the traditional Global System for Mobile Communication (GSM) network architecture comprises a core network, a Base Station Controller (BSC) and a Base Station (BS), wherein the base station controller and the base station also can be collectively called as the Base Station Subsystem (BSS). The interface between the core network and the BSC is called as the A interface, the interface between the BSC and the BTS is called as the Abis interface, and the interface between the BTS and the Mobile Station (MS) is called as the Um interface; the core network, BSC and the BTS cooperatively work, and provides the complete mobile voice service function to the MS.

With the evolution of the technique, the flat GSM network architecture appears, FIG. 2 is a schematic diagram of the flat GSM network architecture, and as shown in FIG. 2, the flat GSM network mainly comprises two layers, i.e. the core network and the Enhanced Base Station (eBTS), wherein the interface between the core network and the enhanced base station is the A interface, the interface between the enhanced base station and the mobile station is the Um interface, and a new interface between the enhanced base stations is defined, which is called as the interface between enhanced base stations and can be used for the interworking between the enhanced base stations. Although the traditional GSM system network architecture and the flat GSM network architecture are the same in the actions of the air interface, one of advantages of the flat GSM network architecture is that it can use the same architecture with the similar flat enhanced High Speed Packet Access+(HSPA+) or the Long Term Evolution (LTE) system network to operate in the co-spectrum, and this co-spectrum operation of the GSM with the HSPA+ or the LTE will cause that the operator wishes to dynamically share the limited spectrum resources in the different wireless techniques (GSM, HSPA+, and LTE and so on), wherein one application scenario possibly appearing is that: the HSPA+ or LTE occupies a majority of spectrum resources, whereas the GSM occupies a minority of spectrum resources, and the amount of the GSM users will not dramatically decreases due to the cause of the communication habit. Thus, the GSM network is required to provide the voice service for these users in relative less spectrum resources, and therefore, a huge challenge is brought to the traditional GSM technique. Since the traditional GSM is the Time Division Multiple Access (TDMA) system, the system capacity is limited to the Time Slot (TS) resources, whereas one TS is only able to bear one Full Rate (FR) voice user or two Half Rate (HR) voice users at the same time.

With the continuous evolution of the communication technique, many techniques for improving the spectrum utilization ratio appear, one of which is the technique of the Voice services over adaptive Multi-user channels on One Slot (VA-MOS), and the technique of the voice services over adaptive multi-user channels on one slot permits to bear two FR voice users or 4 HR voice users on one slot at the same time, thereby improving the support of the whole GSM network for the voice user capacity without increasing the spectrum resources.

However, if the technique of the voice services over adaptive multi-user channels on one slot is applied, it certainly will increase the mutual interference among users in the same one slot and cause the reduction of the signal receiving quality. Since the control channel, for example the Slow Associated Control Channel (SACCH), bears very important control information (the information such as power adjustment, frame adjustment and measurement data and so on), a problem in the SACCH transmission will be caused once the interference increases, a great influence on the communication between the MS and the BTS will be caused, and a severe one will be a call drop.

FIG. 3 is a schematic diagram of four mobile stations multiplexing the HR channel resources in the GSM mode, as shown in FIG. 3, in the traditional GSM mode, two HR users—user 1 and user 2 multiplex the HR carrier 1, and other two HR users—user 3 and user 4 multiplex the HR carrier 2. When the HR carrier 1 and the HR carrier 2 are different frequencies, the SACCH channels among users will not interfere with each other. In the mode of the voice services over adaptive multi-user channels on one slot, four HR users are multiplexed to one slot, then the HR carrier 1 and the HR carrier 2 are the identical frequency, they use the identical SACCH frame mapping way (the traditional mapping way), and SACCH channels of the user 1 and the user 3 and the SACCH channels of the user 2 and user 4 will become the identical frequency interference to each other, whereas since the SACCH is always transmitted with the maximal power, the interference problem among the control channels of different mobile station users will become severe.

In order to improve the SACCH channel performance, the Shifted-SACCH technique appears. FIG. 4 is a schematic diagram of the four mobile stations using the shifted-SACCH frame mapping way to multiplex the HR channel resources in the GSM mode, as shown in FIG. 4, HR users—user 3 and user 4 use the technique called as the shifted-SACCH frame mapping, and this technique makes the SACCH frames of users in the subcarrier 1 of the voice services over adaptive multi-user channels on one slot and the users in the subcarrier 2 of the voice services over adaptive multi-user channels on one slot to be mapped into different time slots, namely they do not appear at the same time, and thus the interference is impossibly formed between them.

Besides, when a certain one or more users are in the silence period of the Discontinuous Transmission (DTX), the Traffic Channel (TCH) corresponding to the user will turn off the transmission power, thus the SACCHs of other users which are situated at the same voice services over adaptive multi-user channels on one slot will not be interfered, thereby improving the SACCH channel performance and ensuring the communication quality.

The appearance of the shifted-SACCH frame mapping technique also cause one problem, namely two frame mapping ways will exist in the network using the technique of the voice services over adaptive multi-user channels on one slot, namely the traditional frame mapping way and the shifted-SACCH frame mapping way, and the mobile terminal is required to obtain the frame mapping way used by a call when establishing this call, as it not only could use the traditional frame mapping way, but also could use the shifted-SACCH frame mapping way. Therefore, it is required to provide a method to make the mobile terminal to be able to obtain which frame mapping way is used when establishing a call.

SUMMARY

In view of this, the main object of the present invention is to provide a method and an apparatus for indicating a frame mapping way, notifying the mobile station of the frame mapping way determined for the mobile station and making the mobile station use the frame mapping way determined by the network side for it to perform the frame mapping In order to achieve the above object, the technical scheme of the present invention is implemented in this way:

a method for indicating a frame mapping way comprises:

a network side notifying a mobile station of information of a frame mapping way used by the mobile station.

Preferably, before notifying the mobile station of the information of the frame mapping way, the method further comprises:

the network side obtaining information of whether the mobile station supports a shifted-SACCH frame mapping capability, and determining whether to use a shifted-SACCH frame mapping way or use a traditional SACCH frame mapping way for the mobile station which supports the SACCH frame mapping capability.

Preferably, the method further comprises:

adding a cell of indication information for indicating the mobile station to use a SACCH frame mapping way in an assignment command message; and said network side notifying the mobile station of the information of the SACCH frame mapping way used by the mobile station through said assignment command message.

Preferably, the method further comprises:

configuring a dedicated indication message for indicating the mobile station to use a SACCH frame mapping way;

said network side notifying the mobile station of the information of the SACCH frame mapping way used by the mobile station through said dedicated indication message.

Preferably, said network side obtaining the information of whether the mobile station supports the shifted-SACCH frame mapping capability comprises:

the mobile station taking the information that it supports the shifted-SACCH frame mapping capability as one cell of Classmark 3 information, encapsulating said Classmark 3 information into a classmark change message to report to said network side;

when said mobile station does not support the shifted-SACCH frame mapping capability, the Classmark 3 information of the classmark change message reported to said network side not including the cell for supporting the shifted-SACCH frame mapping capability;

or when the mobile station acts as a calling party, encapsulating Classmark 2 information which bears the information that the mobile station supports the shifted-SACCH frame mapping capability into CM Service Request message, and reporting to said network side; when the mobile station acts as a called party, encapsulating Classmark 2 information which bears the information that the mobile station supports the shifted-SACCH frame mapping capability into paging response message, and reporting to said network side;

when the mobile station does not support the shifted-SACCH frame mapping capability, the Classmark 2 information of the CM Service Request message reported to said network side not including the cell for supporting the shifted-SACCH frame mapping capability, and the Classmark 2 information of the paging response message reported to said network side not including the cell for supporting the shifted-SACCH frame mapping capability.

An apparatus for indicating a frame mapping way comprises a determination unit and a notification unit, wherein the determination unit is for determining a SACCH frame mapping way used for a mobile station;

the notification unit is for notifying the mobile station of information of a SACCH frame mapping way used by the mobile station.

Preferably, the apparatus further comprises:

an obtaining unit, which is for obtaining information of whether the mobile station supports a shifted-SACCH frame mapping capability;

the determination unit is further for determining whether to use a shifted-SACCH frame mapping way or use a traditional SACCH frame mapping way for the mobile station which supports the SACCH frame mapping capability.

Preferably, the apparatus further comprises:

a first configuration unit, which is for adding a cell of indication information for indicating that the mobile station to use a SACCH frame mapping way in an assignment command message;

the notification unit is further for notifying the mobile station of the information of the SACCH frame mapping way used by the mobile station through said assignment command message.

Preferably, the apparatus further comprises:

a second configuration unit, which is for configuring a dedicated indication message for indicating the mobile station to use a SACCH frame mapping way;

the notification unit is further for notifying the mobile station of the information of the SACCH frame mapping way used by the mobile station through said dedicated indication message.

In the present invention, the network side determines the frame mapping way for each mobile station according to whether the mobile station supports the shifted-SACCH frame mapping capability, and notifies the corresponding mobile station of the determined frame mapping way, thereby solving the problem that the mobile station does not know which frame mapping way to use, and the mobile station can greatly improve the performance of the communication system after using the determined frame mapping way.

BRIEF DESCRIPTION OF THE DRAWINGS

FIG. 3 is a schematic diagram of four mobile stations multiplexing the HR channel resources in the GSM mode;

FIG. 4 is a schematic diagram of the four mobile stations using the shifted-SACCH frame mapping way to multiplex the HR channel resources in the GSM mode;

DETAILED DESCRIPTION

Below it will illustrate the preferred examples of the present invention with reference to drawings.

The technical scheme of the present invention is regarding to: the base station subsystem notifies the mobile station of the indication information of which frame mapping way is used determined for the mobile station when establishing a call in the network using the technique of the voice services over adaptive multi-user channels on one slot, thus implementing that the mobile station supporting the shifted-SACCH frame mapping way and the traditional frame mapping way at the same time clearly knows which frame mapping way should be used after the technique of the voice services over adaptive multi-user channels on one slot is used in the network.

Specifically, besides the base station subsystem (the network side) completes the functions defined in the existing protocol, when channel allocation is needed to be performed for the call establishing, the base station subsystem sends the ASSIGNMENT COMMAND message to the mobile station which is calling, and adds the cell used for indicating the frame mapping way into the ASSIGNMENT COMMAND message to indicate the mobile station to use the indicated frame mapping way to perform the frame mapping. The mobile station obtains the frame mapping way which should be used by this mobile station according to the indication information of the used frame mapping way included in the ASSIGNMENT COMMAND message sent by the base station subsystem.

Below it will further describe the technical scheme of the present invention in detail.

Figure 1:
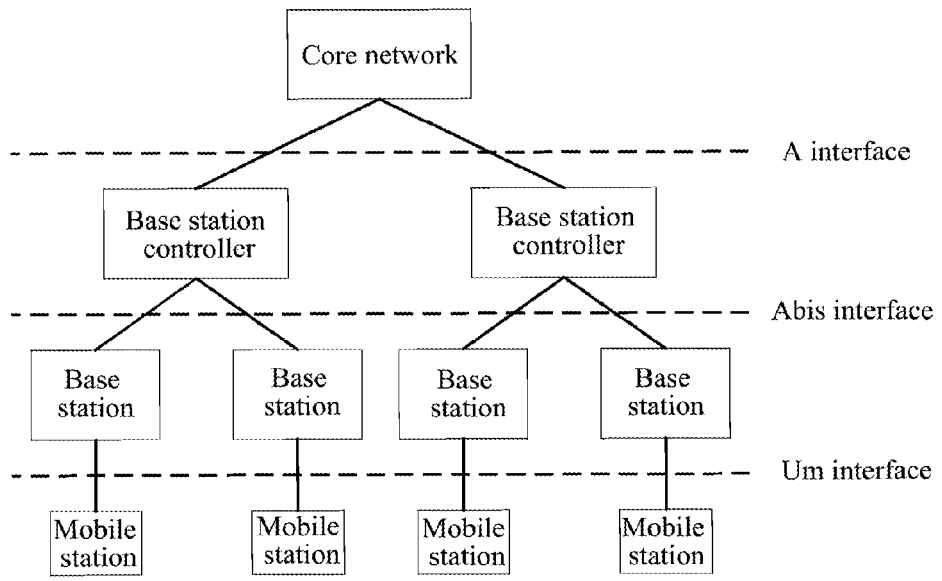
FIG. 1 is a schematic diagram of the existing GSM network architecture.
Figure 2:
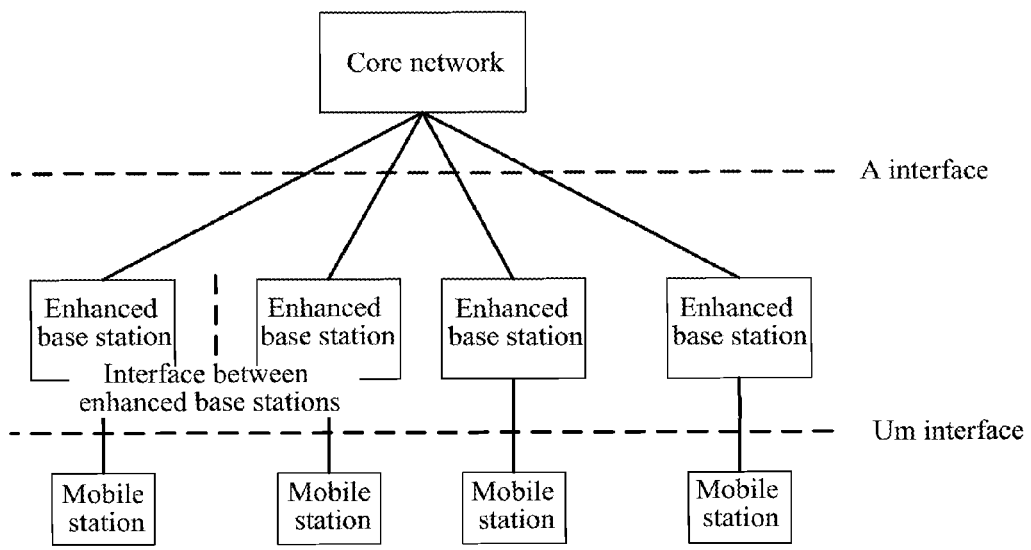
FIG. 2 is a schematic diagram of the flat GSM network architecture.
Figure 5:
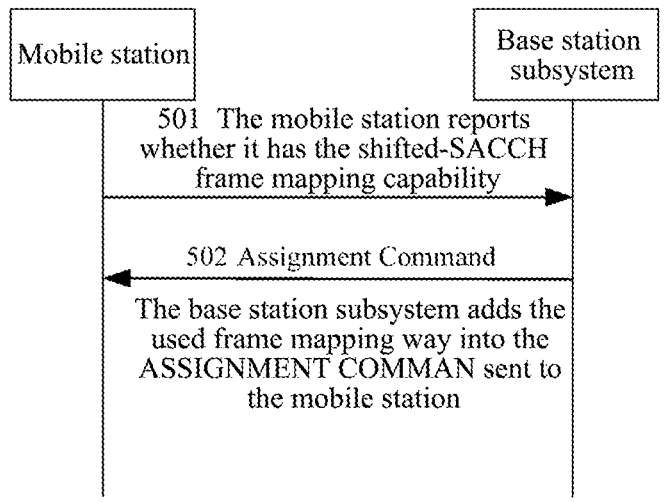
FIG. 5 is a flow chart of the method for indicating the frame mapping way according to the present invention.

FIG. 5 is a flow chart of the method for indicating the frame mapping way according to the present invention, and as shown in FIG. 5, the method for indicating the frame mapping way according to the present invention comprises:

step 501, the base station subsystem obtains whether each mobile station has the shifted-SACCH frame mapping capability.

In the present invention, the information is used that the mobile station actively reports whether it supports the shifted-SACCH frame mapping capability. As a means of implementation, if the network uses the early classmark sending function, the mobile station can take the information that it supports the shifted-SACCH frame mapping capability as one cell of the mobile station Classmark 3, and encapsulates the Classmark 3 into the classmark change message to report to the base station subsystem in the early classmark sending process when establishing the call. The base station subsystem can determine whether this mobile station supports the shifted-SACCH frame mapping capability through the classmark change message reported by the mobile station.

If the network does not use the early classmark sending function, then the Mobile Switching Center (MSC) can send the Classmark request message to the base station subsystem regarding to the mobile station in the dedicated mode, the base station subsystem movably sends the classmark enquiry message to the mobile station after receiving the Classmark request message, the mobile station takes the information that it supports the shifted-SACCH frame mapping capability as one cell of the mobile station Classmark 3 after receiving the Classmark enquiry message, and reports to the base station subsystem through the classmark change message. The base station subsystem can obtain the support condition of this mobile station for the shifted-SACCH frame mapping function after receiving the Classmark change message.

Or, the mobile station encapsulates the Classmark 2 information which bears the information of supporting the shifted-SACCH frame mapping capability into the CM Service Request message when acting as the calling party, and reports to said network side; the mobile station encapsulates the Classmark 2 information which bears the information of supporting the shifted-SACCH frame mapping capability into the paging response message when acting as the called party, and reports to said network side; when said mobile station does not support the shifted-SACCH frame mapping capability, the Classmark 2 information in the CM Service Request message reported to the network side does not include the cell for supporting the shifted-SACCH frame mapping capability, and the Classmark 2 information in the paging response message reported to the network side does not include the cell for supporting the shifted-SACCH frame mapping capability. The base station subsystem can determine whether this mobile station supports the shifted-SACCH frame mapping capability through the classmark change message reported by the mobile station.

Step 502, the base station subsystem adds the indication information of the frame mapping way used by this mobile station into the ASSIGNMENT COMMAN message sent to the mobile station.

Figures 3, 4:
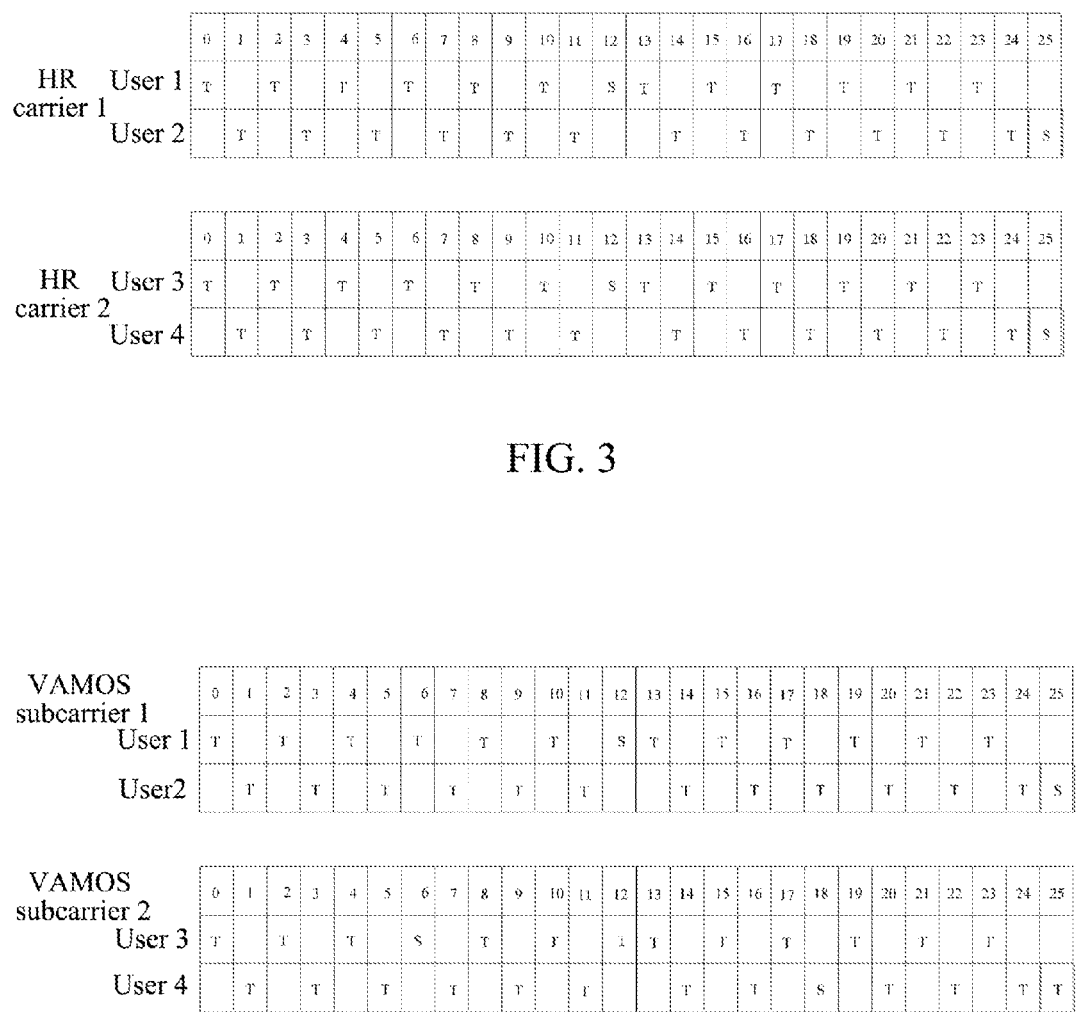
Figure 6:
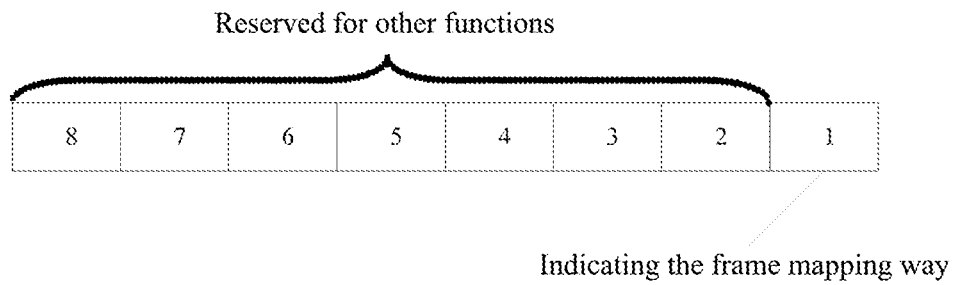
FIG. 6 is a schematic diagram of the structure of the frame mapping indicator according to the present invention.

FIG. 6 is a schematic diagram of the structure of the frame mapping indicator according to the present invention, and as shown in FIG. 6, the frame mapping way indicator is used for notifying the mobile station of the frame mapping way that should be used by this mobile station, wherein the frame mapping indicator occupies 1 bit, and this bit is used for indicating whether the mobile station uses the traditional frame mapping way or the shifted-SACCH frame mapping way. Specifically, when this indicator is "1", it indicates the mobile station to use the shifted-SACCH frame mapping way (the frame mapping way shown in FIG. 4), and when this indicator is "0", it indicates the mobile station to use the traditional frame mapping way (namely using the frame mapping way shown in FIG. 3). Or when this indicator is "0", it indicates the mobile station to use the shifted-SACCH frame mapping way, and when this indicator is "1", it indicates the mobile station to use the traditional frame mapping way.

As a means of the implementation, the above ASSIGNMENT COMMAND message also can be other message sent from the base station subsystem to the mobile station, as long as the indicator shown in FIG. 6 is added into the corresponding message, and certainly, it also can be a new configured dedicated message, which is dedicated for notifying the mobile station to use which frame mapping way.

Figure 7:
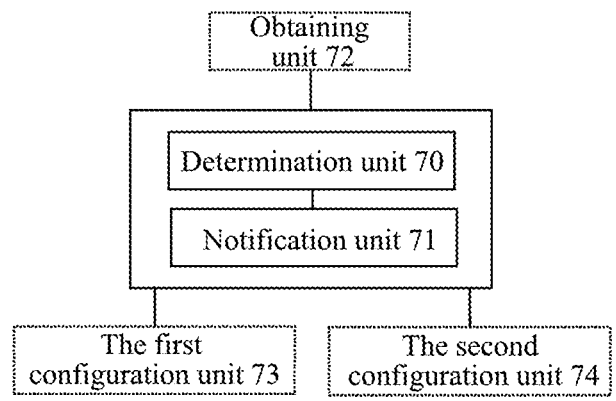
FIG. 7 is a schematic diagram of the composition structure of the apparatus for indicating the frame mapping way according to the present invention.

FIG. 7 is a schematic diagram of the composition structure of the apparatus for indicating the frame mapping way according to the present invention, and as shown in FIG. 7, this apparatus for indicating the frame mapping way according to the present invention comprises a determination unit 70 and a notification unit 71, wherein the determination unit 70 is for determining the used frame mapping way for the mobile station;

the notification unit 71 is for notifying the mobile station of information of the frame mapping way used by the mobile station.

As shown in FIG. 7, the apparatus for indicating the frame mapping way according to the present invention further comprises an obtaining unit 72, which is for obtaining information of whether the mobile station supports the shifted-SACCH frame mapping capability;

the determination unit 70 determines whether to use the shifted-SACCH frame mapping way or use the traditional SACCH frame mapping way for the mobile station which supports the shifted-SACCH frame mapping capability.

As shown in FIG. 7, the apparatus for indicating the frame mapping way according to the present invention further comprises the first configuration unit 73, which is for adding a cell of the indication information for indicating the mobile station to use the SACCH frame mapping way in the ASSIGNMENT COMMAND message;

the notification unit 71 notifies the mobile station of the information of SACCH frame mapping way used by the mobile station through the ASSIGNMENT COMMAND message.

As shown in FIG. 7, the apparatus for indicating the frame mapping way according to the present invention further comprises the second configuration unit 74, which is for configuring dedicated indication message for indicating the mobile station to use the SACCH frame mapping way;

the notification unit 71 notifies the mobile station of the information of SACCH frame mapping way used by the mobile station through the dedicated indication message.

The person skilled in the art should understand that the apparatus for indicating the frame mapping way shown in FIG. 7 is designed for implementing the previous mentioned method for indicating the frame mapping way. The function of each processing unit in the apparatus shown in FIG. 7 can be understood by referring to the related description in the previously mentioned method for indicating the frame mapping way. The function of each processing unit can be implemented by running the program on the processor, and also can be implemented by the specific logical circuit. The person skilled in the art should understand that, in FIG. 7, except the determination unit 70 and the notification unit 71, other processing units are all not the necessary technical features for achieving the main object of the present invention.

The above description is only preferred examples of the present invention, and is not for limiting the protection scope of the present invention.

What is claimed is:

1. A method for indicating a frame mapping way, comprising:
   a network side notifying a mobile station about information of a Slow Associated Control Channel (SACCH) frame mapping way used by the mobile station, wherein the information of the SACCH frame mapping way indicates whether the mobile station uses a traditional frame mapping way or a shifted-SACCH frame mapping way;
   wherein notifying the mobile station of the information of the SACCH frame mapping way further comprises adding a cell of indication information for indicating the mobile station to use the SACCH frame mapping way into assignment command message; and said network side notifying the mobile station of the information of the SACCH frame mapping way used by the mobile station through said assignment command message.

2. The method of claim 1, before notifying the mobile station of the information of the SACCH frame mapping way, further comprising:
   the network side obtaining information of whether the mobile station supports a shifted-SACCH frame mapping capability, and determining whether to use a shifted-SACCH frame mapping way or use a traditional SACCH frame mapping way for the mobile station which supports the SACCH frame mapping capability.

3. The method of claim 1, further comprising:
   configuring dedicated indication message for indicating the mobile station to use the SACCH frame mapping way;
   said network side notifying the mobile station of the information of the SACCH frame mapping way used by the mobile station through said dedicated indication message.

4. The method of claim 2, wherein said network side obtaining information of whether the mobile station supports the shifted-SACCH frame mapping capability comprises:
   the mobile station taking the information that the mobile station supports the shifted-SACCH frame mapping capability as one cell of Classmark 3 information, encapsulating said Classmark 3 information into classmark change message to report to said network side;
   when said mobile station does not support the shifted-SACCH frame mapping capability, the Classmark 3 information in the classmark change message reported to said network side not including a cell for supporting the shifted-SACCH frame mapping capability;
   or when the mobile station acts as a calling party, encapsulating Classmark 2 information which bears the information that the mobile station supports the shifted-SACCH frame mapping capability into CM Service Request message, and reporting to said network side;
   when the mobile station acts as a called party, encapsulating Classmark 2 information which bears the information that the mobile station supports the shifted-SACCH frame mapping capability into paging response message, and reporting to said network side;
   when the mobile station does not support the shifted-SACCH frame mapping capability, the Classmark 2 information in the CM Service Request message reported to said network side not including the cell for supporting the shifted-SACCH frame mapping capability, and the Classmark 2 information in the paging response message reported to said network side not including the cell for supporting the shifted-SACCH frame mapping capability.

5. An apparatus for indicating a frame mapping way, comprising
   a determination unit, a notification unit, and a first configuration unit, wherein the determination unit is for determining a used Slow Associated Control Channel (SACCH) frame mapping way for a mobile station;
   the notification unit is for notifying the mobile station about information of a SACCH frame mapping way used by the mobile station, wherein the information of the SACCH frame mapping way indicates whether the mobile station uses a traditional frame mapping way or a shifted-SACCH frame mapping way;
   the first configuration unit is for adding a cell of indication information for indicating the mobile station to use the SACCH frame mapping way into assignment command message;
   the notification unit is further for notifying the mobile station of the information of the SACCH frame mapping way used by the mobile station through said assignment command message.

6. The apparatus of claim 5, said apparatus further comprising:
   an obtaining unit, which is for obtaining information of whether the mobile station supports a shifted-SACCH frame mapping capability;
   the determination unit is further for determining whether to use a shifted-SACCH frame mapping way or use a traditional SACCH frame mapping way for the mobile station which supports the SACCH frame mapping capability.

7. The apparatus of claim 5, said apparatus further comprising:
   a second configuration unit, which is for configuring dedicated indication message for indicating the mobile station to use a SACCH frame mapping way;

the notification unit is further for notifying the mobile station of the information of the SACCH frame mapping way used by the mobile station through said dedicated indication message.

8. The method of claim 2, further comprising:
configuring dedicated indication message for indicating the mobile station to use the SACCH frame mapping way;
said network side notifying the mobile station of the information of the SACCH frame mapping way used by the mobile station through said dedicated indication message.

9. The apparatus of claim 6, said apparatus further comprising:
a second configuration unit, which is for configuring dedicated indication message for indicating the mobile station to use a SACCH frame mapping way;
the notification unit is further for notifying the mobile station of the information of the SACCH frame mapping way used by the mobile station through said dedicated indication message.

10. The method of claim 1, wherein the network side comprises the network side of a mobile communication network.

11. The method of claim 10, wherein the mobile communication network comprises a Global System for Mobile Communication (GSM) network.

12. The method of claim 5, wherein the GSM network comprises a flat GSM network that supports one or more of a flat enhanced High Speed Packet Access +(HSPA+) and the Long Term Evolution (LTE) system network operating in a co-spectrum.

13. A computer program product comprising a computer readable medium having computer usable program code executable to perform operations for indicating a frame mapping way, the operations of the computer program product comprising:
notifying a mobile station about information of a Slow Associated Control Channel (SACCH) frame mapping way that the mobile station is to use, the notification transmitted to the mobile station by way of a network side of a mobile communications network, the mobile station in communication with the mobile communications network, wherein the information of the SACCH frame mapping way indicates whether the mobile station uses a traditional frame mapping way or a shifted-SACCH frame mapping way;
wherein notifying the mobile station of the information of the SACCH frame mapping way further comprises adding a cell of indication information for indicating the mobile station to use the SACCH frame mapping way into assignment command message; and
said network side notifying the mobile station of the information of the SACCH frame mapping way used by the mobile station through said assignment command message.

14. The computer program product of claim 13, prior to notifying the mobile station of which SACCH frame mapping way to use, further comprising:
the network side obtaining information of whether the mobile station supports a shifted-SACCH frame mapping capability; and
determining whether to use one of a shifted-SACCH frame mapping way and a traditional SACCH frame mapping way for the mobile station which supports the SACCH frame mapping capability.

15. The computer program product of claim 14, wherein the network side obtaining information of whether the mobile station supports the shifted-SACCH frame mapping capability comprises:
the mobile station taking the information that the mobile station supports the shifted-SACCH frame mapping capability as one cell of Classmark 3 information and encapsulating the Classmark 3 information into classmark change message to report to the network side; and
in response to the mobile station not supporting the shifted-SACCH frame mapping capability, the Classmark 3 information in the classmark change message reported to the network side does not include a cell for supporting the shifted-SACCH frame mapping capability.

16. The computer program product of claim 14, wherein the network side obtaining information of whether the mobile station supports the shifted-SACCH frame mapping capability comprises:
in response to the mobile station acting as a calling party, encapsulating Classmark 2 information which bears the information that the mobile station supports the shifted-SACCH frame mapping capability into a CM Service Request message, and reporting to the network side;
in response to the mobile station acting as a called party, encapsulating Classmark 2 information which bears the information that the mobile station supports the shifted-SACCH frame mapping capability into a paging response message, and reporting to the network side;
in response to the mobile station not supporting the shifted-SACCH frame mapping capability, the Classmark 2 information in the CM Service Request message reported to the network side not including the cell for supporting the shifted-SACCH frame mapping capability, and the Classmark 2 information in the paging response message reported to the network side not including the cell for supporting the shifted-SACCH frame mapping capability.

* * * * *